US006802280B2

(12) United States Patent
Mårtensson

(10) Patent No.: US 6,802,280 B2
(45) Date of Patent: Oct. 12, 2004

(54) ROTARY PARLOUR FOR MILKING OF ANIMALS

(75) Inventor: Bengt-Göran Mårtensson, Stockholm (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 10/381,221

(22) PCT Filed: Sep. 19, 2001

(86) PCT No.: PCT/SE01/02004

§ 371 (c)(1),
(2), (4) Date: May 16, 2003

(87) PCT Pub. No.: WO02/23979

PCT Pub. Date: Mar. 28, 2002

(65) Prior Publication Data

US 2004/0020442 A1 Feb. 5, 2004

(30) Foreign Application Priority Data

Sep. 21, 2000 (SE) .......................................... 0003375

(51) Int. Cl.[7] .................................................. A01K 3/00
(52) U.S. Cl. .................... 119/14.04; 119/520; 119/521
(58) Field of Search .............................. 119/14.04, 520, 119/521, 516, 14.03

(56) References Cited

U.S. PATENT DOCUMENTS

| | | | | |
|---|---|---|---|---|
| RE22,657 E | * | 8/1945 | Babson et al. | 119/14.03 |
| 2,904,002 A | * | 9/1959 | Ferris | 119/520 |
| 3,095,854 A | | 7/1963 | Bott et al. | |
| 3,765,373 A | | 10/1973 | Phillips | |
| 4,419,961 A | * | 12/1983 | Vandenberg et al. | 119/14.03 |
| 4,452,175 A | * | 6/1984 | Thompson et al. | 119/14.03 |
| 5,718,185 A | * | 2/1998 | Pichler et al. | 119/14.04 |
| 6,050,219 A | * | 4/2000 | van der Lely | 119/14.08 |

FOREIGN PATENT DOCUMENTS

| | | | | |
|---|---|---|---|---|
| DE | 3113752 A1 | * | 2/1982 | A01K/1/12 |
| DE | 3104887 A1 | * | 8/1982 | A01K/1/12 |
| DE | 3145371 A1 | * | 5/1983 | A01J/5/00 |
| DE | 4131860 A1 | * | 4/1993 | A01K/1/12 |
| FR | 2595907 A1 | * | 9/1987 | A01K/1/12 |
| GB | 1201651 | | 8/1970 | |
| WO | WO 97/37530 | | 10/1997 | |

* cited by examiner

*Primary Examiner*—Robert P. Swiatek
*Assistant Examiner*—Joan M. Olszewski
(74) *Attorney, Agent, or Firm*—Hovey Williams LLP

(57) ABSTRACT

The invention relates to a rotary parlour for milking of animals, especially cows (1). The parlour includes a rotary platform (2) having dividing members (3) arranged to divide the platform (2) into stalls. The dividing members (3) have a substantially straight extension between a first end (4) and a second end (5). The dividing members (3) are each connected to a feeding trough (7) constituting a unit arranged turnably around a vertical axis (8). A center (9) of the feeding trough (7) is located at a distance from a vertical plane (10) extending through the first (4) and second (5) ends of the dividing member (3). By such an arrangement of the feeding trough (7) in relation to the dividing member, it is possible for the animals to stand in a naturally straight position and to eat from the feeding troughs (7) during the milking operation.

18 Claims, 3 Drawing Sheets

ROTARY PARLOUR FOR MILKING OF ANIMALS

THE BACKGROUND OF THE INVENTION AND PRIOR ART

The present invention relates to a rotary parlour for milking of animals, wherein the parlour comprises a rotary platform arranged to form a support surface for the animals, stalling means arranged to divide the platform into stalls receiving individual animals, wherein the stalling means comprises dividing members having a first end and a second end and being turnably arranged around a respective vertical axis, wherein the dividing members, in a stalling position, are arranged to be located between adjacent animals with the first end located at a radially outer position in relation to the second end, control means arranged to control the turning of the dividing members around the respective vertical axis and feeding troughs, which each has a centre and is connected to a respective one of the dividing members.

Rotary parlours equipped with turnably arranged dividing members are known. By using turnable dividing members, a very close positioning of cows on the rotary parlour is possible to create. Hereby, the cows may, for example, be positioned in a herringbone pattern by the dividing members along the platform during the milking operation.

Rotary parlours equipped with feeding troughs are known. A feeding trough attracts the cows and facilitates a correct positioning of the cows in the stalls. The milking period is also a suitable occasion to feed the cows. By the feeding, the cows become relaxed during the milking operation.

From GB 1 201 651, it is known to use a rotary parlour equipped with turnably arranged dividing members carrying feeding troughs. In this construction, the dividing members carry the feeding troughs in such a manner that the cows have to stand in the stalls with their heads turned in relation to the remaining body for eating the food in the feeding troughs.

From U.S. Pat. Nos. 3,095,854, 3,765,373 and WO 97/37530, rotary parlours are known equipped with fixedly arranged dividing members carrying feeding troughs. Fixedly arranged dividing members do not enable a close positioning of the cows on the platform as turnably arranged dividing members.

SUMMARY OF THE INVENTION

The object of the present invention is to provide a rotary parlour equipped with turnable dividing members and feeding troughs in a simple and functional combination, where it is both possible to arrange the animals close together on the platform and feed the animals in a normal straight position during the milking operation.

This object is achieved by the rotary parlour initially defined, which is characterised in that the centre of the respective feeding trough is located at a distance from a vertical plane extending through the first and second ends of the respective dividing members. The positioning of the feeding troughs at a distance from the dividing members makes it possible for the animals to stand in a natural straight position in the stalls and thus to eat in a convenient manner during the milking operation.

At the same time, the existence of the turnable dividing members enables a close positioning of the animals on the platform.

According to an embodiment of the invention, the centre of the respective feeding trough is located at a straight-lined distance of 0,2 to 0,6 meters from the vertical plane. The distance may vary with the kind of animal to be milked on the rotary parlour. In order to obtain an optimal positioning of the animals on the platform at the same time as the animals may be able to stand in a natural straight position during the milking period, said distance, preferably, is at least half the width of the animals. Preferably, the feeding troughs are carried in a fixed position in relation to the respective dividing member. Thereby, the feeding troughs and the respective dividing member are turnably arranged around the vertical axes as a unit.

According to a further embodiment of the invention, the vertical axes may be positioned to extend through the respective feeding trough. Such vertical axes may be designed, for example, as vertical posts each turnably carrying a unit comprising a dividing member and a feeding trough. Usually, a feeding trough filled with food is heavier than a dividing member. Therefore, it is suitable to arrange the vertical axis adjacent to the centre of the feeding trough in order to minimise the loads on the vertical post. The animals may also apply loads to the feeding trough during the feeding process. Preferably, the vertical axes are positioned to extend through the centre of the feeding trough. Advantageously, the vertical axis of the respective dividing member is positioned at a shorter distance from the first end than from the second end. Thereby, the vertical axes and the feeding trough are located in a radially outer position of the platform. The cows face outwards during the milking operation and operators work from inside of the platform.

According to a further embodiment of the invention, said control means comprises a first guide means arranged to turn the dividing members to the stalling position. The first guide means urges the animals to a correct position in the stalls by the turning movement of the respective dividing member. The first guide means may comprise a guide wheel connected to each dividing member and a guide rail arranged to extend around at least a part of the platform. Preferably, the guide rail extends around the whole platform except at the places where the animals enter and leave the platform. Consequently, the first guide means urges the cows to a correct stalling position during the whole milking operation.

According to a further embodiment of the invention, the control means may comprise second guide means arranged to turn the dividing members to an open position enabling entering of the animals to the stalls. In order to enable entrance of the animals to the stalls, it is necessary to turn the dividing members from the stalling position. In the open position, the second end of the dividing member may be located in a radially outer position in relation to the first end. In the open position, the dividing member has a radially outer location in relation to the location in the stalling position. With the dividing member located in such a radially outer position, an animal may enter the platform and walk around the feeding trough internally on the platform. Thereafter, the animal walks straight ahead and enters the preceding feeding trough with the head in a radially outer position in relation to the remaining body. The second guide means may comprise a guide member arranged to run along a cam surface sloping in such a manner that the guide member is urged to a position corresponding to the open position of the dividing member.

According to a further embodiment of the invention, each dividing member has an essentially straight extension between the first end and the second end. Thereby, a simple and functional construction of the dividing member is obtained. Preferably, the stalling means is arranged to position the animals in a herringbone pattern along the annular platform. By such an arrangement, the animals may be placed close together on the platform. Certainly, it is possible to use other kinds of arrangement of the animals on the platform in connection with dividing members.

According to a further embodiment of the invention, the rotary parlour comprises an entry and an exit for the animals to and from the platform, respectively. Advantageously, the entry and exit are located at the outer circumference of the platform and located beside each other. Thus, the animals rotate nearly 360° during the milking operation. The entry may have a gate, which is arranged to open periodically in response to the position of the platform and enable entrance of animals to the platform. Preferably, each stall comprises milking means as a cluster. Thus, a simple attachment of the milking means to the animal is obtained.

BRIEF DESCRIPTION OF THE DRAWINGS

The present invention is now to be explained more closely by means of a preferred embodiment, which is disclosed as an example, and with reference to the attached drawings.

BRIEF DESCRIPTION OF A PREFERRED EMBODIMENT OF THE INVENTION

Figure 1:
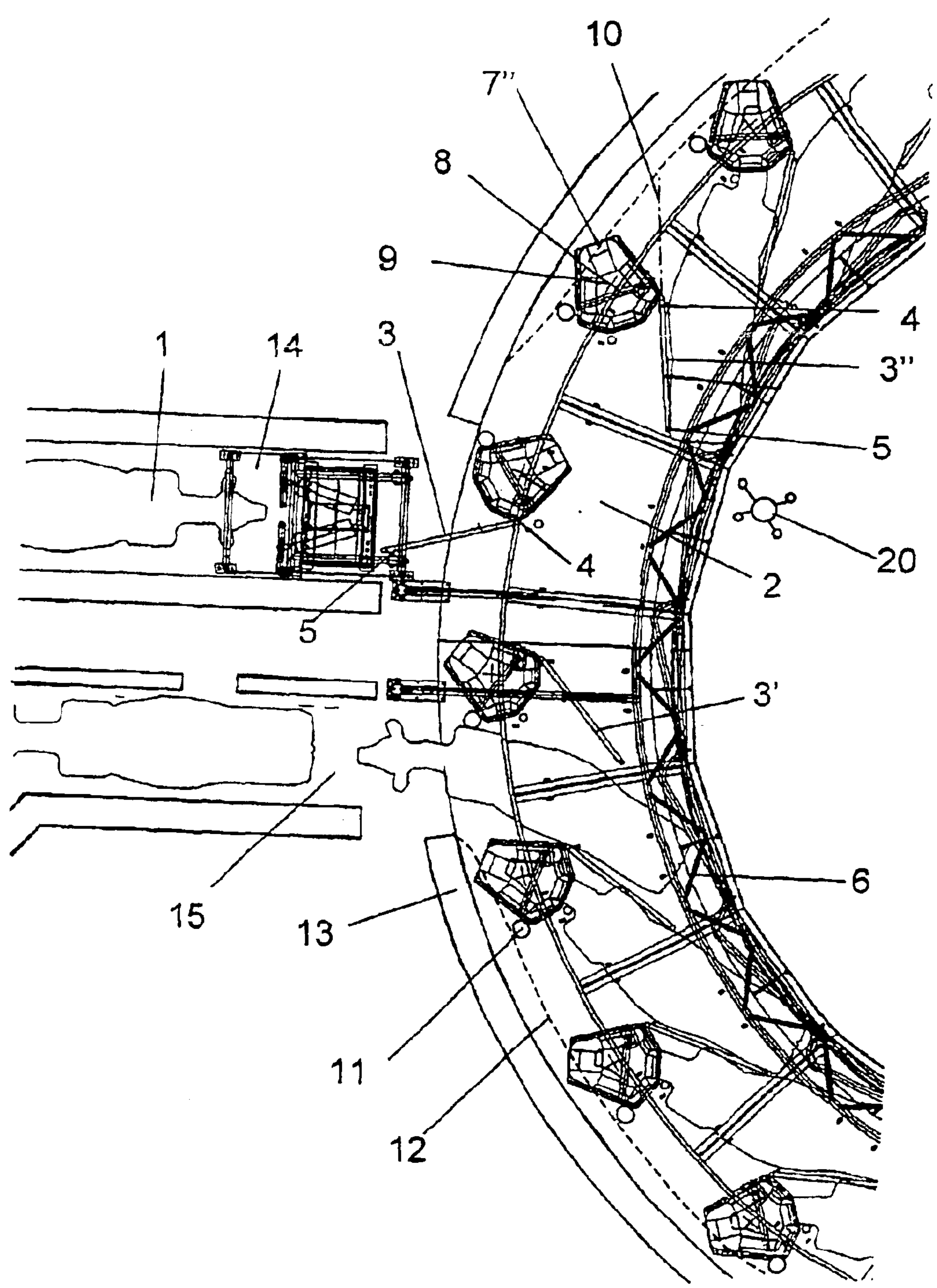
FIG. 1 shows a view from above of a rotary parlour for milking of cows, according to the invention.
Figure 2:
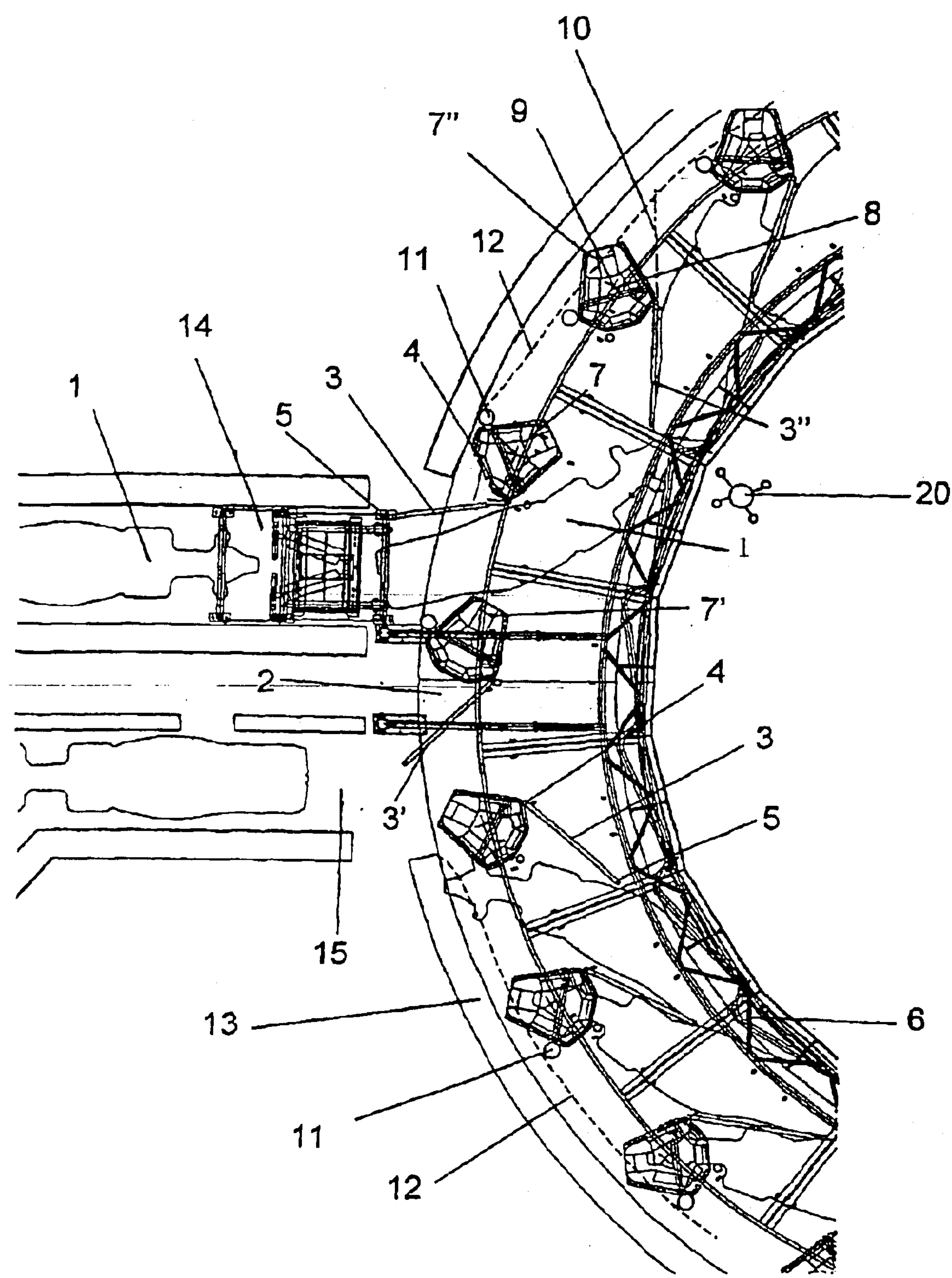
FIG. 2 shows the rotary parlour, in FIG. 1, in a differently turned position

FIGS. 1 and 2 show a rotary parlour for milking of cows 1 from above. The parlour comprises a rotary platform 2 having an annular extension. The platform 2 is arranged to form a support surface for the animals 1. In order to divide the platform 2 into stalls for receiving individual cows 1, stalling means is arranged along the extension of the platform 2. The stalling means comprises dividing members 3 having an essentially straight extension between a first end 4 and a second end 5 and a rumprail 6 arranged at the inner periphery of the platform 2. The stalling means is used to positioning the cows 1 in the respective stalls in a correct position. The rumprail 6 works also as a protection for operators and prevents the cows from accidentally falling or stepping out of the platform 2 into the centre of the parlour. In the stalling position, the cows 1 are positioned in a herringbone pattern along the annular platform 2. The cows 1 face outwards and the operators work from inside of the annular platform 2. In the stalling position, the dividing members 3 are arranged between adjacent cows 1 with the first end 4 located in a radially outer position in relation to the second end 5. By using turnable dividing members 3, it is possible to position the cows 1 close together on the platform 2.

Each of the dividing members 3 is at the first end 4 fixedly connected to a feeding trough 7. The feeding troughs 7 attract the cows and facilitate the positioning of the cows in the stalls. Consequently, the respective dividing member 3 and feeding trough 7 constitute a unit. The unit is turnably arranged around a vertical axis 8. The vertical axis 8 extens through a centre 9 of the feeding trough 7. The centre 9 of the feeding troughs 7 is arranged at a distance from a vertical plane 10 extending through the first 4 and second 5 ends of the dividing member 3. The centre 9 of the respective feeding troughs 7 may be positioned at a straight-line distance of about half the width of a cow 1 from said vertical plane 10. At such a distance, an optimal close positioning of the cows 1 is obtained at the same time as the cows 1 may be able to stand in a natural straight position and to eat during the milking operation.

The rotary parlour comprises control means arranged to control the turning of the units comprising a dividing member and a feeding trough 7 around the vertical axes 8. The control means comprises a first guide means arranged to turn the dividing members 3 to the stalling position. The first guide means comprise a guide wheel 11 fixedly attached to each of the feeding troughs 7 and a guide rail 12 attached to an outer wall 13 arranged around the platform 2 except at an entry 14 and an exit 15 for the cows 1. Thus the guide rail 12 has an extension around substantially the whole outer wall 13. The entry 14 and exit 15 are located adjacent to each other at an outer circumference of the platform 2. The guide wheels 11 are arranged to roll along the guide rail 12. The guide wheels 11 are placed at a distance from the respective vertical axis 8 around which the respective unit is turnably arranged. The guide wheels 11 are attached to the feeding troughs 7 in a position so the guide wheels 11 in engagement with the guide rails 12 are arranged to turn and keep the dividing member 3 in the stalling position. Consequently, the dividing members 3 are substantially arranged to be kept in the stalling position except when the dividing members 3 are in a position at the entry 14 and the exit 15.

Figure 3:
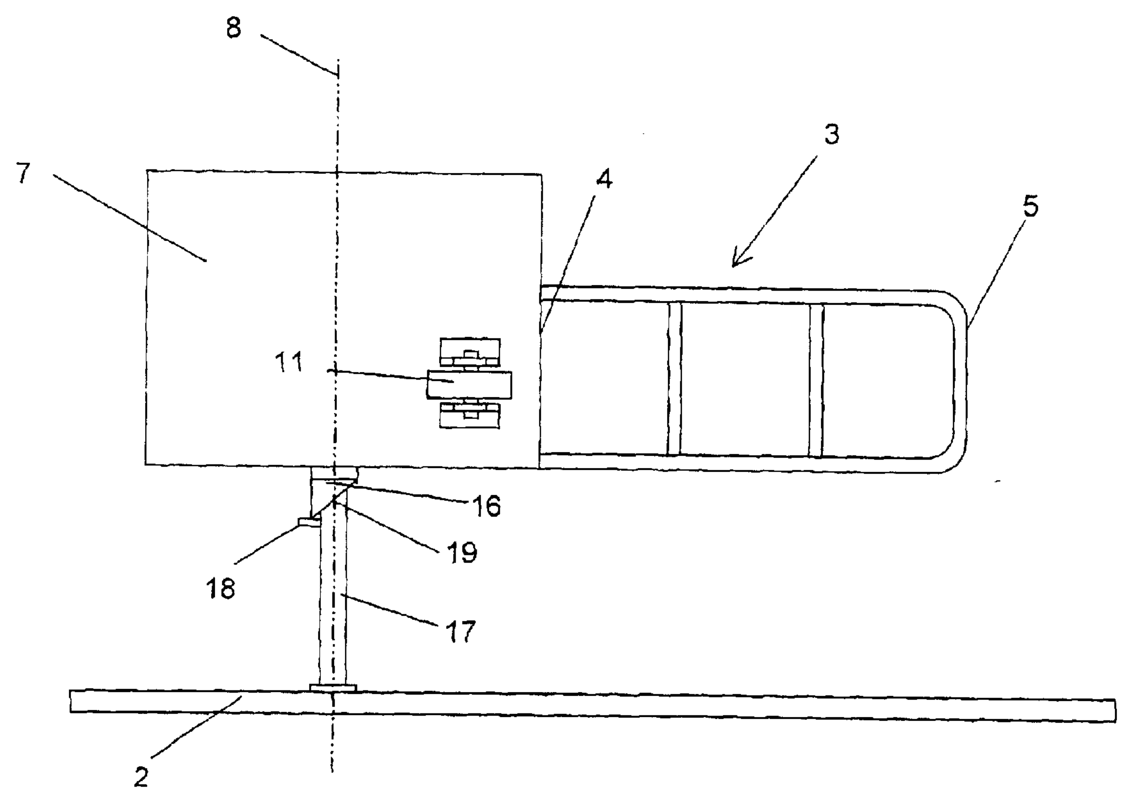
FIG. 3 shows a side view of a dividing member and a feeding trough, according to the invention.

The control means comprises also second guide means arranged to control the turning of the dividing members 3 when the guide wheels 11 are not in contact with the guide rail 12. The second guide means is arranged to turn the dividing member 3 from the stalling position to an open position enabling the entering of the cows 1 to the stalls. FIG. 3 shows a side view of a unit comprising a dividing member 3 and a feeding trough 7. The second guide means comprises a sleeve 16 rigidly connected to a bottom part of each feeding trough 7. Each sleeve 16 and thereby each dividing member 3 and feeding trough 7 are turnably arranged around a vertical post 17. Each vertical post 17 is, at a bottom part, fixedly attached to the platform 2. A guide member in form of a pin 18 is fixedly arranged on each post 17 at a suitable position. The pin 18 is arranged to slide along a cam surface 19 arranged on a bottom part of the sleeve 16. The cam surface 19 is sloping in such a manner that the pin 18 is urged, by the weight of the feeding trough 7, towards an upper position of the cam surface 19. The upper position corresponds to a stalling position of the dividing member 3. By means of the pin 18 and the cam surface 19, the dividing member 3 is arranged to turn around the vertical axis 8 to an open position when the guide wheel 11 is not in engagement with the guide rail 12.

The exit 15 is located adjacent to the entry 14. Consequently, the cows rotate nearly 3600 during the milking operation. Each of the stalls comprises milking means, as a cluster 20, which is attached to the cow 1 by an operator after the cow 1 has entered the stall. The cluster 20 is automatically removed before the cow leaves the stall and walks out through the exit 15.

The rotary parlour operates as follows. The cows 1, which are to be milked, are guided in a row through the entry 14. The rotary parlour, shown in FIG. 1, has a dividing member 3 extending across the entry 14 and thereby preventing the leading cow 1 from entering the platform 2. In FIG. 2, the dividing members 3 are rotated forwardly so that the dividing member 3 provides a free passage for the leading cow 1 to enter the platform 2. Alternatively, an openable gate may control the entry of the cows 1 to the platform 2. The cow 1 enters the platform 2 between the above-mentioned dividing member 3 and the following dividing member 3' and feeding trough 7', as seen in FIG. 2. The dividing member 3 is here in an opened position with the second end 5 located in a radially outer position in relation to the first end 4. In this open position, the dividing member 3 leaves a free passage internally of the feeding trough 7. The cow 1 walks through this passage internally around the feeding trough 7 and then straight-ahead towards the previous feeding trough 7" which is connected to previous dividing member 3". After the cow 1 has entered the previous feeding trough 7", the guide wheel 11, which is connected to the dividing member 3", gets in engagement with the guide rail 12. Initially, the guide rail 12 has a sloping surface, which in contact with the guide wheel 11 initiates a turning motion of the dividing member 3" around the vertical axis 8 from the open position to the stalling position. By that motion, the dividing member 3" urges the cow 1 to a correct position in the stall.

In the stalls, the cow 1 faces outwards and an operator attaches a cluster 20 to the cow 1 from the inside of the annular platform 2. The cows 1 are arranged in a herringbone pattern along the annular platform 2 during the milking operation. The cows 1 rotate nearly 360° on the platform 2 during the milking operation. The cows 1 stand in a natural straight position and eat from the food in the feeding troughs 7 during the milking operation. Before a cow 1 reaches the exit 15, the cluster 20 is automatically removed from the cow 1. Thereafter, the cow 1 leaves the stall and the platform 2 through the passage between two adjacent feeding troughs 7, as seen in FIG. 1. The guide rail 12 ends at the end of the outer wall 13 adjacent to the exit 15. The guide wheel 11 gets out of engagement with the guide rail 12 and the dividing member 3 is free to turn from the stalling position. After the cow 1 has left the platform 2, the second guide means is able to turn the dividing member 3 to the open position in order to enable entrance of a new cow 1 to the stall.

The invention is not restricted to the described embodiments in the figures, but may be varied freely within the scope of the claims. Other types of control means than the above-mentioned may, for example, be used.

What is claimed is:

1. A rotary parlour for milking of animals, wherein the parlour comprises:

- a rotary platform arranged to form a support surface for the animals;
- stalling means arranged to divide the platform into stalls for receiving individual animals, wherein the stalling means comprises a plurality of dividing members each having a first end, a second end, and a vertical axis, wherein the dividing members are arranged to be located between adjacent animals when in a stalling position, with the first end located at a radially outer position in relation to the second end, and wherein the vertical axis of the respective dividing member is positioned at a shorter distance from the first end than from the second end;
- control means arranged to control the turning of the dividing members around their respective vertical axes; and
- feeding troughs, each of which has a center and is connected to a respective one of the dividing members, wherein the center of each feeding trough is located at a distance from a vertical plane extending through the first and second ends of the respective dividing member.

2. A device according to claim 1, wherein the center of the respective feeding trough is located at a straight-lined distance of 0.2 to 0.6 meters from the vertical plane.

3. A device according to claim 1, wherein the feeding troughs are rigidly connected to the respective dividing members.

4. A device according to claim 1, wherein the vertical axes are positioned to extend through the respective feeding trough.

5. A device according to claim 4, wherein the vertical axes are positioned to extend through the center of the respective feeding trough.

6. A device according to claim 1, wherein said control means comprises first guide means arranged to turn the dividing members to the stalling position.

7. A device according to claim 6, wherein said first guide means comprises a guide wheel connected to each dividing member and a guide rail arranged to extend around at least a part of the platform.

8. A device according to claim 6, wherein said control means comprise second guide means arranged to turn the dividing members to an open position enabling entering of the animals to the stalls.

9. A device according to claim 8, wherein the second end of the dividing member is located in a radially outer position in relation to the first end in said open position.

10. A device according to claim 8, wherein said second guide means comprise a guide member arranged to run along a cain surface sloping in such a manner that the guide member is urged to a position of the cam surface corresponding to the open position of the dividing member.

11. A device according to claim 1, wherein each dividing member has an essentially straight extension between the first end and second end.

12. A device according to claim 1, wherein the stalling means is arranged to position the animals in a herringbone pattern along the platform.

13. A device according to claim 1, wherein the rotary parlour comprises an entry for the animals to enter the platform.

14. A device according to claim 1, wherein the rotary parlour an exit for the animals from the platform.

15. A device according to claim 1, wherein each stall further comprises milking means.

16. A rotary parlor for milking dairy animals, said parlor comprising:

- a rotary platform providing a support surface for the animals received thereon;
- stalling structure provided on said platform for providing a plurality of stalls arranged on said platform for receiving individual animals, said stalling structure including a plurality of dividing members each having a first end and a second end and being mounted to said platform for turning movement about a respective upright axis whereby the dividing members are arranged on the platform to be located between adjacent animals when in a stalling position with the first end located at a radially outer position in relation to the second end, and wherein the upright axes of each of the respective dividing members is positioned at a shorter distance from the first end than from the second end;
- a controller operatively coupled to the dividing members for controlling the turning of each of said plurality of dividing members about its respective upright axis; and
- a plurality of feeding troughs, each of said plurality of feeding troughs having a center when viewed in plan and being connected to a respective one of the dividing members, wherein the center of each feeding trough is laterally offset a distance from a vertical plane extending through the first and second ends of the respective dividing member.

17. A parlour as set forth in claim 16, wherein the upright axes of the respective dividing members are positioned to extend through their respective feeding trough.

18. A parlour as set forth in claim 16, wherein the controller includes a first guide arranged for turning the dividing members to the stalling position.

* * * * *